(12) United States Patent
Schumann et al.

(10) Patent No.: US 9,755,224 B2
(45) Date of Patent: Sep. 5, 2017

(54) CATHODIC ELECTRODE OF A LITHIUM-BASED ACCUMULATOR

(71) Applicant: Robert Bosch GmbH, Stuttgart (DE)

(72) Inventors: Bernd Schumann, Rutesheim (DE); Jean Fanous, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/943,163

(22) Filed: Nov. 17, 2015

(65) Prior Publication Data

US 2016/0149204 A1 May 26, 2016

(30) Foreign Application Priority Data

Nov. 19, 2014 (DE) ......................... 10 2014 223 608

(51) Int. Cl.
*H01M 4/13* (2010.01)
*H01M 4/62* (2006.01)
*H01M 10/052* (2010.01)
*H01M 4/02* (2006.01)

(52) U.S. Cl.
CPC .............. *H01M 4/13* (2013.01); *H01M 4/624* (2013.01); *H01M 10/052* (2013.01); *H01M 2004/021* (2013.01); *H01M 2004/028* (2013.01)

(58) Field of Classification Search
CPC ...... H01M 4/13; H01M 4/624; H01M 10/052; H01M 2004/021; H01M 2004/028
See application file for complete search history.

(56) References Cited

U.S. PATENT DOCUMENTS

2013/0143115 A1    6/2013  Sun et al.

FOREIGN PATENT DOCUMENTS

| GB | 2499984 A | 9/2013 |
|---|---|---|
| JP | 2014159578 A | 9/2014 |
| WO | 03/012908 A2 | 2/2003 |

OTHER PUBLICATIONS

Heon-Cheol Shin et al., Porous silicon negative electrodes for rechargeable lithium batteries, Journal of Power Sources 2005, 139, 314-320.

*Primary Examiner* — Jane Rhee
(74) *Attorney, Agent, or Firm* — Norton Rose Fulbright US LLP; Gerard Messina

(57) ABSTRACT

A cathodic electrode of a lithium-based accumulator includes a basic structure, which is formed from fibers, flakes or grains. For this purpose, the fibers, flakes or grains are interspersed with channels, cavities or open pores.

17 Claims, 7 Drawing Sheets

CATHODIC ELECTRODE OF A LITHIUM-BASED ACCUMULATOR

FIELD OF THE INVENTION

The present invention relates to a cathodic electrode of a lithium-based accumulator.

BACKGROUND INFORMATION

There exist primary or secondary cells having positive and negative electrodes as Li-accumulators, zinc-air cells or lithium-air cells or other types of cells or metal-air cells, which function according to an electrochemical principle. Primary cells are not rechargeable, while secondary cells are rechargeable. Generally, some types of cells having metal electrodes contain metal as negative electrodes, which following the discharge are used up by a chemical reaction. In this case, the metal in the chamber of the negative electrode is converted into a chemical product, usually an ion, which enters an electrochemical reaction at the positive electrode, the so-called cathode. This occurs under the influence of another chemical element such as sulfur, oxygen or another material such as a metal oxide, for example lithium cobalt or other oxide mixtures of lithium, nickel, manganese and/or cobalt.

Cells that have no intercalation reactions, such as lithium-air cells or lithium-sulfur cells, form a chemical reaction product following the discharge of the cell. This reaction product may be formed:

A) outside of conductive fibers or grains, i.e. on the surface of conductive carbon structures or coated (e.g. TiC-coated) conductive structures; or it may be formed within electroactive structures B) such as sulfurized polyacrylic nitrile grains or fibers in the case of a sulfur-polyacrylic nitrile cathode of a lithium-sulfur cell according to the related art.

Structures A and B are exposed to a solid or liquid electrolyte, which connects the cathode space with the anode space in an ion-conductive manner via a separator.

Patent document WO 03/012908 A2 discusses electrode materials that have interpenetrating structures in order to ensure fast transport paths both for electrons as well as for lithium ions. The interpenetrating structures may have a varying topology or morphology.

In Heon-Cheol Shin et al., Journal of Power Sources 2005, 139, 314-320, are discussed porous negative electrodes for rechargeable lithium batteries. The Journal discusses the differences of the charge transport in different ratios of pore depth and diameter.

Patent document US 2013/0143115 A1 discuss three-dimensional porous electrode materials for lithium-ion batteries. The document mentions that the diffusion path of the lithium ions is shortened by a porous structure of the electrode material.

SUMMARY OF THE INVENTION

In a cathodic electrode according to the present invention of a lithium-based accumulator, a basic structure is provided that is formed from fibers, flakes or grains. The fibers, flakes or grains are interspersed with channels, cavities or open pores, which in the context of the present disclosure are also referred to as interspersions.

In the context of the present invention, a fiber is understood as a formation that is thinly shaped in proportion to its length. The fiber may have an assigned diameter, it being possible for this to be an average diameter across its length for example. The fiber may be formed at a ratio of diameter to length of more than 1:3.

A flake in the context of the present invention is understood as a formation which has a planar two-dimensional extension, i.e. a length, a width and a thickness, in contrast to the fiber, which when viewed from afar is an essentially one-dimensional formation. The length with respect to the width may be developed in a ratio of more than 1:3, and the width with respect to the thickness may be also developed in a ratio of more than 1:3.

A grain in the context of the present invention is understood as a formation that is developed to be essentially spherical.

A channel in the context of the present invention is understood as a through hole, which has an entry and an exit, the reference of entry or exit being arbitrary. The channel may also be called a tunnel.

A cavity in the context of the present invention is understood as a recess that has only an entry, in contrast to the channel.

A pore in the context of the present invention is understood as a bubble-shaped hollow space in the interior of a formation. An open pore has at least one entry and possibly also an exit. An open pore is therefore a special cavity or a special channel.

The present basic structure may be developed to be homogeneous. According to the present invention, the homogeneous basic structure, in particular a sulfurized polyacrylic nitrile fiber, grain or flake, is enriched on its boundary surface to the electrolyte by specially configured interspersions.

According to the present invention, the electrochemically active particles in the cathode are made up of two unmixable phases:

A) an electrochemically active structure (also called basic structure), which in the case of a lithium-sulfur electrode may be a sulfurized polyacrylic nitile-like fiber, or flake or grain, which takes part in the cathode reaction and B) a second phase, which arises by the removal of a polymer, which is not electrochemically active and which is removed completely in order to yield in the electrochemically active structure the channels, cavities or open pores at the nanoscale, to which the electrolyte has access.

Example of a synthesis: The structures may be formed by block copolymerization and self-assembly of polyacrylic nitrile with a second partner, such as e.g. poly-epsilon-caprolactone or poly butyl acrylate, which form cylindrical or lamellar structures after mixing and drying the solutions. Thereupon, the second phase may be removed by pyrolysis or hydrolysis so that the polyacrylic nitrile remains. After subsequent sulfurization or in parallel, i.e. at the same time as this process, the sulfur composite thus obtained becomes electrochemically active.

The distance between the interspersions, their lamellar or cylindrical-tubular shape and also length and depth of the interspersions may be adapted by adjusting the conditions of reaction.

In the event that cavities or channels are developed in fibers, a synthesis may be achieved for example in that a soluble fiber such as polyvinyl alcohol or another soluble polymer such as polystyrene or polyvinylpyrrolidone is spun into an electroactive or conductive precursor and that the fiber, which forms the cavity, is later dissolved in water or an organic solvent in order to form an interspersion. The electroactive precursor may contain sulfur for example or another active electrochemical material. Fibers are produced e.g. by co-electro-spinning a soluble polymer with a thicker fiber of the precursor of the electroactive polymer as well as by removal of the soluble part of the soluble polymer.

In the event that cavities are developed in grains, this may also occur by spraying grain-forming material of low viscosity, such as a dissolved polymer in the form of a liquid, and later drying of the drop on the electro-spun fibers of the soluble polymer. The soluble polymer is later removed again so that a grain may develop having a cavity and dimensions as described above.

In the event that the basic structure is interspersed with pores, this may also occur by spraying nanoparticles of a soluble salt, e.g. calcium carbonate, onto grains or fibers, the nanoparticles being later dissolved by acid such as hydrochloric acid or acetic acid.

In the event that the basic structure is formed from grains and that the grains are interspersed with tubular cavities extending into the depth, the present invention may provide for the cavities to have a cavity depth of up to half of an average grain diameter.

The average grain diameter may be in the range of 50 to 500 nm, and the cavity depth may be in the range of 10 to 300 nm.

In the event that the basic structure is formed from fibers and the fibers are interspersed with cavities, the present invention may provide for the cavities to be developed on the surface of the fibers in the direction of longitudinal axes of the fibers and in a lamellar manner.

It particularly may be that the cavities have a cavity length in the direction of the longitudinal axes of the fibers of no more than half, which may be exactly half of an average fiber diameter. The average fiber diameter may be in the range of 150 nm to 1 µm or of 150 nm to 0.5 nm.

In the event that the basic structure is formed from flakes and the flakes are interspersed with cavities, the present invention may provide for the cavities to be developed on the surface of the flakes in a circular or lamellar manner and to have a depth of at most two thirds of an average flake thickness. For this purpose, cavities situated on the upper side and on the lower side may be correlated to one another using a suitable method of synthesis in such a way that they have a distance from one another that approximately corresponds to a lateral distance between cavities.

In the event that the channels, cavities or open pores have a circular cross section on the surface of the fibers, flakes or grains, or have an essentially circular cross section, since this of course depends on the geometry of the underlying fiber, flake or grain, the present invention provides for these to have an average distance from one another of approximately a one-fold to a five-fold, which may be of approximately a one-fold to a two-fold average diameter of the circular cross section. This significantly increases the ionic resistance of the electrode.

The present invention furthermore provides for the channels, cavities or open pores on the surface of the fibers, flakes or grains may be arranged in a triangular, pentagonal or hexagonal pattern or a mixture of these, it being possible for the surface of the basic structure to be filled with the interspersions in a regular and optimized manner for example by self-assembly of polymeric phases in a block copolymerization process.

According to one specific embodiment, the fibers, flakes or grains are interspersed in a superficial layer with the channels, cavities or open pores, the superficial layer being developed on a core made of what may be a conductive material. For this purpose, the present invention may provide for a layer thickness of the superficial layer of a quarter up to a multiple, in particular two-fold, three-fold or five-fold of the thickness of the core to be developed in order to obtain a sufficient electrochemically active mass.

The core is in this instance likewise formed from fibers, flakes or grains, which may have a irregular cross section or a circular cross section or even a network-like structure. The core is coated using the described two-phase system, and channels, cavities or pores are formed as described in the two-phase system.

The core may be made up of any conductive material and may have for example conductive oxides, in particular doped tin oxide, carbon, carbon nanotubes, carbon fibers or metals and alloys, in particular electrochemical metal-coated oxides or carbon fibers.

An average distance between the core and the interspersions, i.e. the channels, cavities or open pores, may be between half the magnitude and three times the magnitude of an average distance of the channels, cavities or open pores with respect to one another. Advantageously, an average free path length of an ion in the electrochemically active material is thus very short so as to reduce longer paths of the ion to the outside and thus to reduce the ionic resistance of the cathode.

In the event that the basic structure is made up of fibers or grains and the fibers or grains are interspersed with channels or open pores, an average fiber or grain diameter of 0.1 to 5 µm, which may be of 0.3 to 2 µm, particularly of 0.5 to 2 µm is developed. An average channel diameter or pore diameter may be between 0.05 and 0.4 µm, particularly between 0.1 and 0.3 µm.

In the event that the basic structure is made up of fibers or grains and the fibers or grains are interspersed with pores, an average fiber or grain diameter of 0.1 to 5 µm, which may be of 0.3 to 2 µm, particularly of 0.5 to 2 µm is developed. An average pore diameter may be between 0.05 and 0.4 µm, particularly between 0.1 and 0.3 µm.

The cavities, open pores and channels of all examples may contain an increased concentration of electrochemically active materials, which increase the cathode capacity, in particular e.g. sulfur sulfides or polysulfides in the case of lithium-sulfur accumulators or metal-sulfur accumulators.

In particular, when the basic structure is formed from an electrochemically active material such as sulfurized polyacrylic nitrile or another sulfurized material, it is possible to fill the cavities, pores or channels with a second electrochemically active component and/or electrolyte, which increases both the electrode capacity as well as the rate of reaction and thus the C-rate capacity of the cathode.

The basic structure may be manufactured from the electrochemically active material. Alternatively, the basic structure may merely form a carrier for the electrochemically active material, which is then located in an interior of the basic structure. In this case, the interspersions may have a diameter of 5 to 300 nm, in particular of 20 to 100 nm. The ion-conducting structures may in this instance have a diameter of 0.4 to 5 µm, the pores all being connected to one another via the concentration of the pore-forming substance.

The measures of the present invention increase in particular the electrochemically active surface area and shorten the distance from the interior of the active material to the electrolyte in a cathodic electrode. The present invention thus provides a cathodic electrode having a high C-rate and increased conductivity.

The measures of the present invention achieve a much shorter path between the participants in the reaction, e.g.

from the metal ions, i.e. lithium ions, to the electrochemically active material on or in the grain or the fiber or flake in the cathode space.

Specific embodiments of the present invention are depicted in the drawings and explained in greater detail in the description below.

Identical or similar components are designated by the same reference numerals in the following description of the exemplary embodiments of the present invention, a repeated description of these components being omitted in such cases. The figures represent the subject matter of the present invention only schematically.

DETAILED DESCRIPTION

Figure 1:
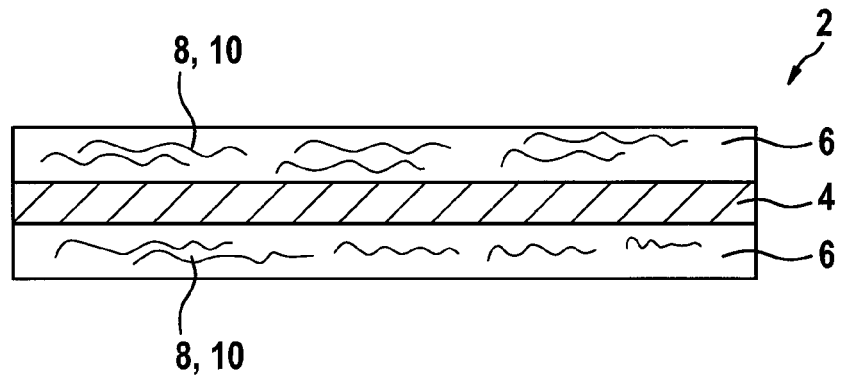
FIG. 1 shows a sectional view of a cathodic electrode.

FIG. 1 shows a sectional view through a cathodic electrode 2 according to one specific embodiment of the present invention.

Cathodic electrode 2 includes a current collector 4, which may be made from a metal for example, in particular from aluminum, and electrochemically active layers 6 situated on both sides of current collector 4, which include the electrochemically active cathode material.

Electrochemically active layers 6 have a basic structure 8, which includes fibers 10 in the case shown. Fibers 10 may be processed in the manner described previously in order to form basic structure 8.

In additional specific embodiments that are not shown, the cathodic electrode 2 shown in FIG. 1 may also have within the scope of the present invention current collectors 4, which have the electrochemically active layer 6 only on one side.

The elements of basic structure 8 described in the following, in particular fibers 10, grains 12 and flakes 14, having the described interspersions, in particular cavities 16, channels 18 and open pores 20, may be provided in the cathodic electrode 2 shown in FIG. 1 instead of the shown fibers 10.

Figure 2:
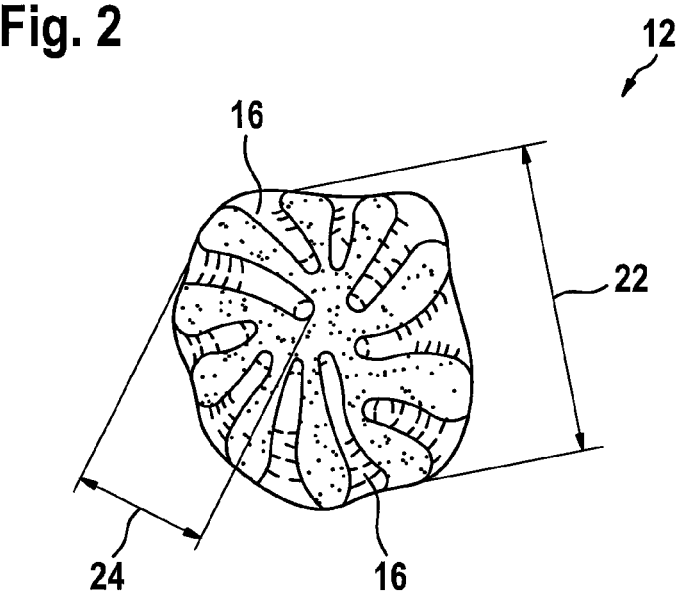
FIG. 2 shows a sectional view of a grain according to a first specific embodiment.

FIG. 2 shows a grain 12 according to a first specific embodiment of the present invention, which is interspersed with cavities 16, cavities 16 in the shown exemplary embodiment extending into the depth in a tubular manner.

A grain diameter 22 of grain 12 may be in the range of 50 to 500 nm. A cavity depth 24 of cavities 16 is for example in the range of 10 to 300 nm.

Figure 3:
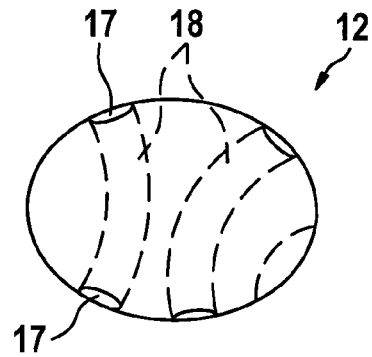
FIG. 3 shows a top view on a grain according to a second specific embodiment.

FIG. 3 shows grain 12 according to another specific embodiment of the present invention, grain 12 being interspersed with channels 18.

Channels 18 have channel entries 17, each channel 18 having at least two such channel entries 17 so as to form a through hole in the form of a tunnel.

Figure 4:
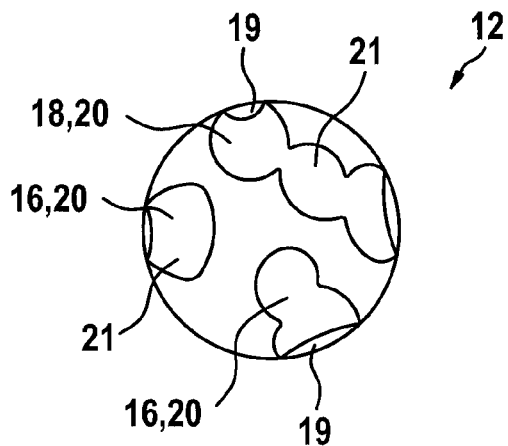
FIG. 4 shows a sectional view of a grain according to a third specific embodiment.

FIG. 4 shows grain 12 according to another specific embodiment of the present invention, grain 12 being interspersed with pores 20.

Pores 20 include bubbles 21 in the interior of grain 12 and pore entries 19, which make them open pores 20. Pores 20 having one pore entry 19 correspond to cavities 16 described with reference to FIG. 2 and pores 20 having at least two pore entries 19 correspond to the channels 18 described with reference to FIG. 3.

Figure 5:
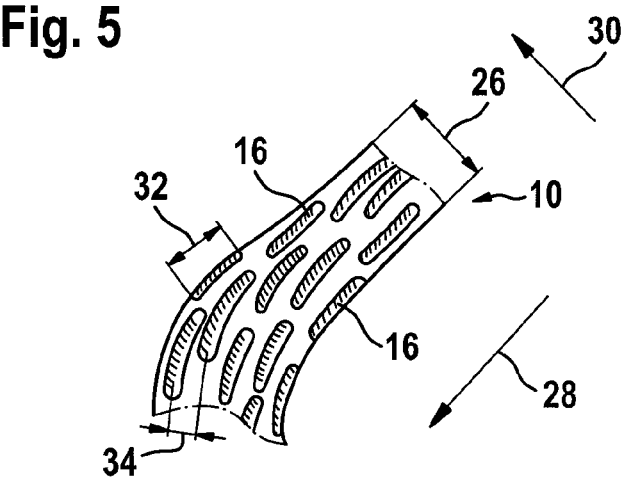
FIG. 5 shows a top view on a fiber according to a first specific embodiment.

FIG. 5 shows a fiber 10 according to a first specific embodiment of the present invention, fiber 10 being interspersed with cavities 16.

Fiber 10 has a fiber longitudinal axis 28 and a fiber transverse axis 30 as well as a fiber diameter 26. Cavities 16 are essentially developed in lamellar fashion in the direction of fiber longitudinal axis 28. Cavities 16 have a cavity length 32, which corresponds to approximately half of the average fiber diameter 26. In another specific embodiment, the cavity length 32 of such lamellar cavities 16 is formed in fiber 10 at a length of two thirds to twice the fiber diameter 26 (not shown). Cavities 16 have a cavity lateral distance 34 from one another, which is smaller than the cavity length 32.

Figure 6:
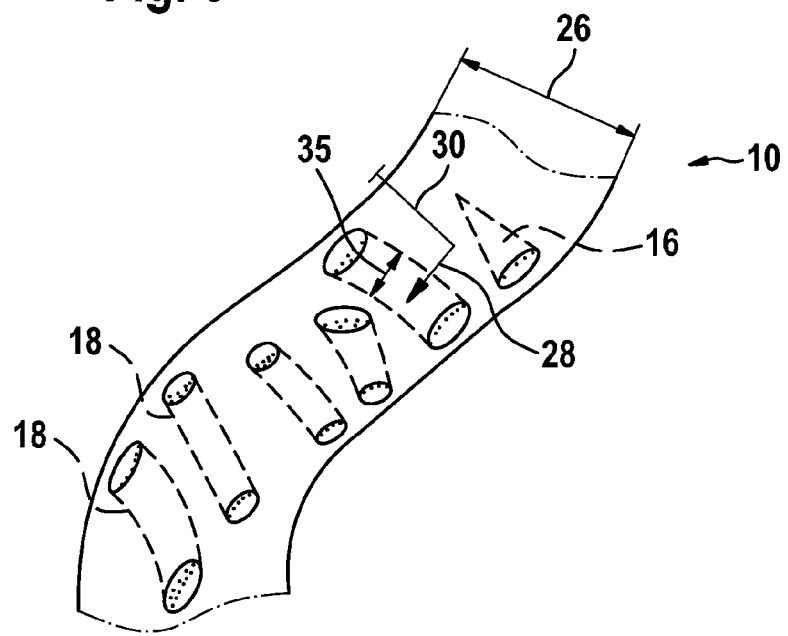
FIG. 6 shows a top view on a fiber according to a second specific embodiment.

FIG. 6 shows fiber 10 according to another specific embodiment of the present invention, fiber 10 being interspersed with channels 18 and cavities 16.

Channels 18 in this instance extend essentially along fiber transverse axis 30. Fiber diameter 26 has a size of 0.1 to 5 µm. Channels 18 have channel diameter 35 of 0.05 to 0.5 µm.

Figure 7:
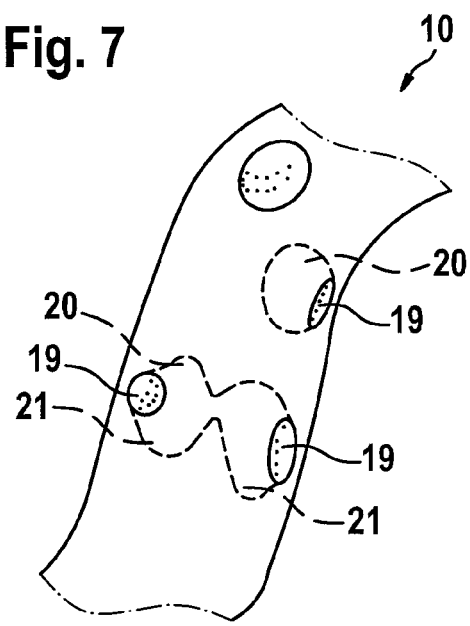
FIG. 7 shows a top view on a fiber according to a third specific embodiment.

FIG. 7 shows fiber 10 according to another specific embodiment of the present invention, fiber 10 being interspersed with pores 20. Pores 20 are developed to be open as described with reference to FIG. 4 and include bubbles 21 and pore entries 19.

Figure 8:
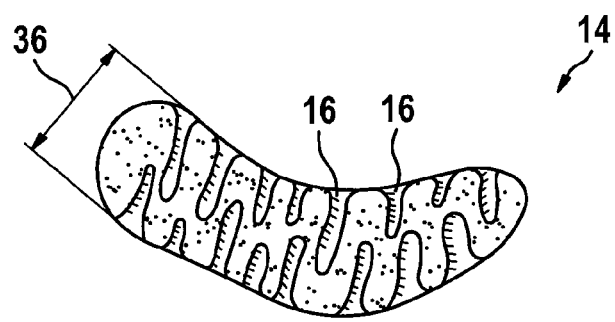
FIG. 8 shows a sectional view of a flake according to a first specific embodiment.

FIG. 8 shows a flake 14 according to a first specific embodiment of the present invention, flake 14 being interspersed with cavities 16.

Flake 14 is shown in a sectional view and has an average flake thickness 36. Cavities 16 are in turn developed in tubular fashion and have depths of approximately one to two thirds of flake thickness 36.

Figure 9:
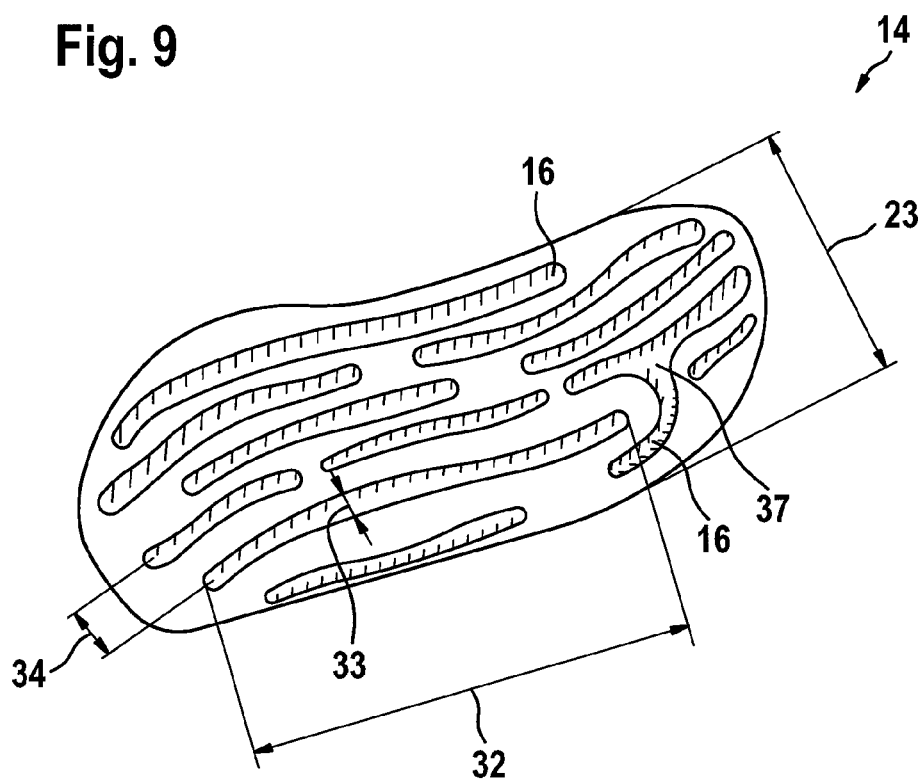
FIG. 9 shows a top view on a flake according to a second specific embodiment.

FIG. 9 shows flake 14 according to another specific embodiment of the present invention, flake 14 having cavities 16, which are developed in lamellar fashion and have a cavity length 32. Cavity length 32 is substantially longer than a cavity width 33 and than cavity lateral distance 34. The cavity length 32 is in this case two thirds to twice the size of a flake width 23. Flake 14 additionally comprises cavities 16 that have cavity branchings 37, whereby the space is utilized further in optimized fashion.

Figure 10:
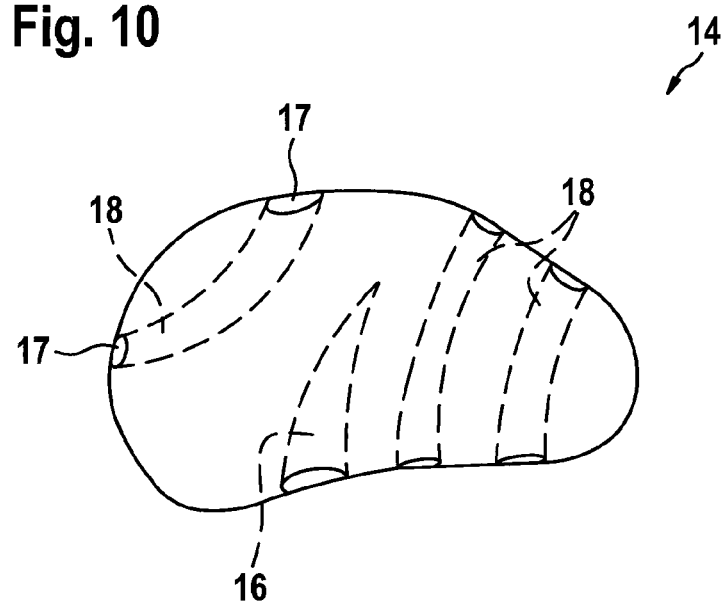
FIGS. 10 and 11 show top views on flakes according to a third specific embodiment.
Figure 11:
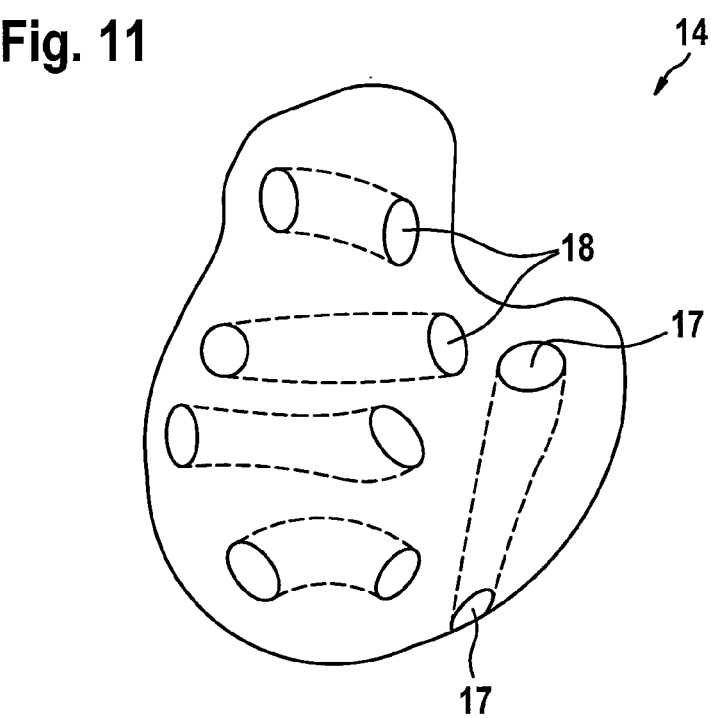

FIGS. 10 and 11 show flakes 14, which are interspersed with channels 18 and cavities 16.

Figure 12:
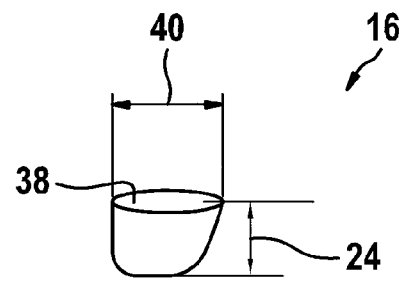
FIG. 12 shows a detailed representation of a cavity.

FIG. 12 shows a detailed representation of cavity 16 with cavity depth 24 and cavity diameter 40. Cavity 16 has an essentially circular cross section 38, circular cross section 38 representing the exit opening from basic structure 8 (not shown).

Figure 13:
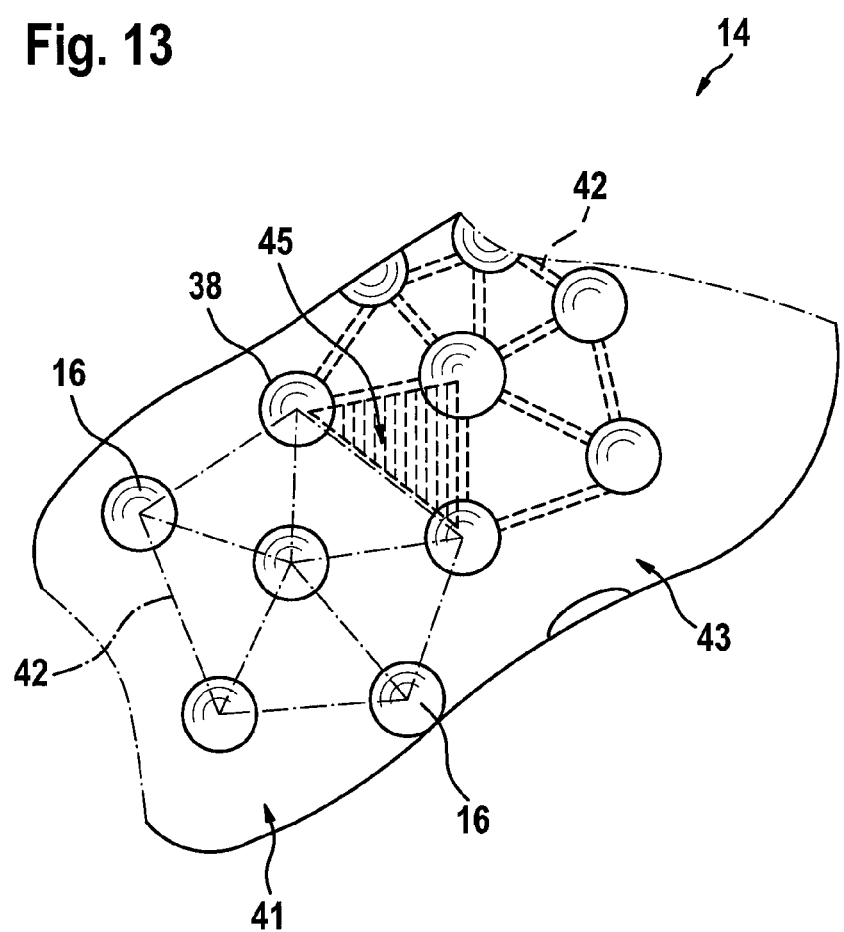
FIG. 13 shows a top view on a section of a flake according to one specific embodiment.

FIG. 13 shows a section of flake 14 in a top view, cavities 16 being arranged in specific patterns on the surface. The represented patterns include a pentagonal structure 41, a hexagonal structure 43 and a triangular structure 45. Cavities 16 have circular cross sections 38 and are situated with respect to one another at an average distance of approximately a one-fold up to a five-fold of the average diameter of circular cross sections 38.

Figure 14:
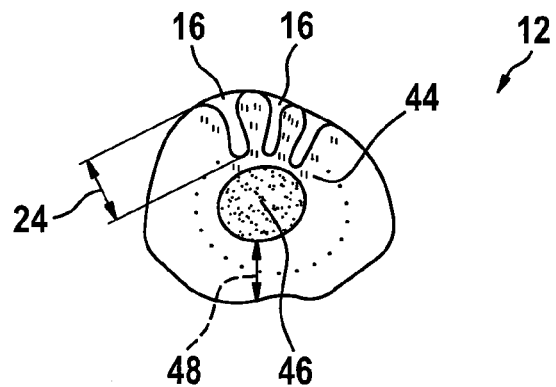
FIG. 14 shows a sectional view of a grain having a core according to a first specific embodiment.

FIG. 14 shows grain 12 having a core 46 according to a first specific embodiment of the present invention, core 46 being made from a conductive material. Core 46 is developed in spherical fashion. Grain 12 includes a superficial layer 44, which covers core 46, superficial layer 44 being interspersed with cavities 16. Superficial layer 44 has a thickness 48, which is greater than the average cavity depth 24.

Figure 15:
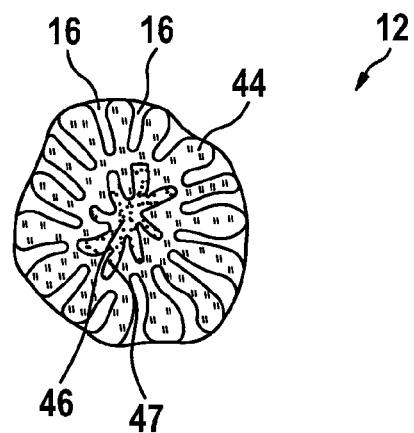
FIG. 15 shows a sectional view of a grain having a core according to a second specific embodiment.

FIG. 15 shows another exemplary embodiment of grain 12 having core 46 and superficial layer 44 interspersed with cavities 16, core 46 here having an irregular cross section having core lamellas 47.

Figure 16:
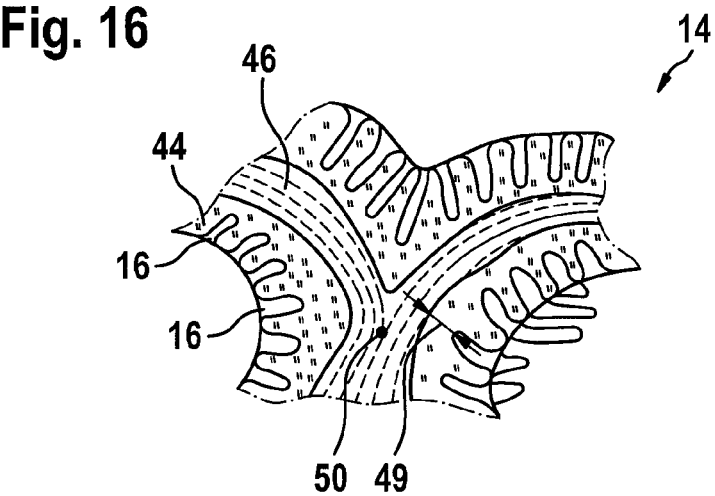
FIG. 16 shows a sectional view of a formation according to another specific embodiment.

FIG. 16 shows an exemplary embodiment of flake 14, flake 14 having core 46 and core branching 50 and superficial layer 44. The network-like structure of flake 14 typically includes multiple core branchings 50. Superficial layer 44 is in turn interspersed with cavities 16. Cavities 16 are spaced with respect to core 46 at a core-cavity distance 49.

The present invention is not restricted to the exemplary embodiments described here and the aspects stressed therein. Rather, a multitude of variations that lie within the scope of the actions of one skilled in the art are possible within the framework indicated by the disclosures herein.

What is claimed is:

1. A lithium-based accumulator, comprising:
   an anode electrode;
   a cathode electrode;
   a separator region between the anode electrode and the cathode electrode;
   wherein:
      the cathode electrode includes a current collector and an electrochemically active layer;
      the electrochemically active layer includes a plurality of basic structures that are formed as at least one of fibers, flakes, and grains and that include a conductive material core surrounded by a non-electrochemically active polymer in which are interspersed at least one of channels, cavities, and open pores that open to a surface of the basic structures.

2. The lithium-based accumulator of claim 1, wherein, the basic structures include grains interspersed with tubular cavities with a cavity depth of up to half of an average grain diameter.

3. The lithium-based accumulator of claim 2, wherein the average grain diameter is in the range of 50 to 500 nm, and the cavity depth is in the range of 10 to 300 nm.

4. The lithium-based accumulator of claim 1, wherein the basic structures include fibers interspersed with cavities that are configured in a lamellar manner on a surface of the respective fibers and that have a length that extends in a direction approximately parallel to longitudinal axes of the respective fibers.

5. The lithium-based accumulator of claim 4, wherein the cavities have in the direction of the fiber longitudinal axes a cavity length of approximately half of an average fiber diameter.

6. The lithium-based accumulator of claim 5, wherein the average fiber diameter is in the range of 150 nm to 1 µm.

7. The lithium-based accumulator of claim 1, wherein the basic structures include flakes that have a length, a width, and a depth that is less than the width, and the flakes are interspersed with cavities, the cavities being configured on the surface of the flakes in a circular or lamellar manner and having a depth of at most two thirds of an average thickness of the respective flakes.

8. The lithium-based accumulator of claim 1, wherein the at least one of channels, cavities, and open pores have a circular cross section on the surface of the at least one of fibers, flakes, and grains, and an average distance between pairs of adjacent ones of the at least one of channels, cavities, and open pores is between a one-fold and a five-fold of an average diameter of the circular cross section.

9. The lithium-based accumulator of claim 1, wherein a layer thickness of the non-electrochemically active polymer is a quarter up to a two-fold, three-fold or five-fold of the thickness of the core.

10. The lithium-based accumulator of claim 1, wherein the basic structures include fibers or grains interspersed with channels or open pores, an average fiber or grain diameter is from 0.1 to 5 µm and an average channel diameter or pore diameter is from 0.05 to 0.4 µm.

11. The lithium-based accumulator of claim 1, wherein the basic structures include fibers or grains interspersed with channels or open pores, an average fiber or grain diameter is from 0.3 to 2 µm, and an average channel diameter or pore diameter is from 0.1 to 0.3 µm.

12. The lithium-based accumulator of claim 1, wherein the basic structures include fibers or grains interspersed with channels or open pores, an average fiber or grain diameter is from 0.5 to 2 µm, and an average channel diameter or pore diameter is from 0.1 to 0.3 µm.

13. The lithium-based accumulator of claim 1, wherein all of the at least one of channels, cavities, and open pores are completely separated from the core by the polymer.

14. The lithium-based accumulator of claim 1, wherein the at least one of channels, cavities, and open pores open to a boundary of the separator region, the separator region including an electrolyte.

15. The lithium-based accumulator of claim 1, wherein the at least one of channels, cavities, and open pores are filled with electrochemically active material.

16. The lithium-based accumulator of claim 1, wherein the at least one of channels, cavities, and open pores are filled with sulfur sulfides or polysulfides.

17. The lithium-based accumulator of claim 1, wherein the conductive material core is made of a conductive oxide.

* * * * *